United States Patent [19]

Forsyth

[11] Patent Number: 5,007,599
[45] Date of Patent: Apr. 16, 1991

[54] HYDRAULICALLY-ACTUATED CONTROLLER FOR REEL DRIVE

[75] Inventor: Allen P. Forsyth, Portland, Oreg.

[73] Assignee: Atlas Copco Construction and Mining Holding AB, Stockholm, Sweden

[21] Appl. No.: 386,956

[22] Filed: Jul. 28, 1989

[51] Int. Cl.⁵ .......................................... B65H 75/42
[52] U.S. Cl. ................................................ 242/86.51
[58] Field of Search ............. 242/86.51, 86.5 P, 75.53, 242/75.51

[56] References Cited

U.S. PATENT DOCUMENTS

| | | | |
|---|---|---|---|
| 2,665,081 | 3/1950 | Slomer | 242/86.51 |
| 2,670,153 | 2/1954 | Hair | 242/86.51 |
| 2,764,365 | 9/1956 | Davis et al. | 242/75.53 |
| 2,912,184 | 11/1959 | Lee | 242/86.51 |
| 3,334,839 | 8/1967 | Carlson | 242/86.51 |
| 4,114,827 | 9/1978 | Maier | 242/86.51 |
| 4,511,100 | 4/1985 | Oetringhaus | 242/86.51 |
| 4,537,364 | 8/1985 | Pollman et al. | 242/86.51 |

*Primary Examiner*—Lenard A. Footland
*Assistant Examiner*—John P. Darling
*Attorney, Agent, or Firm*—Klarquist, Sparkman, Campbell, Leigh & Whinston

[57] ABSTRACT

A hydraulically-actuated controller is disclosed for controlling delivery of hydraulic fluid from a variable-displacement, pressure-compensated pump to a hydraulically-powered reel on which is wound a cable or other flexible member extending from the reel to a tie point. Rotation of the reel is controlled appropriately to maintain the cable tautly between the reel and tie point as the distance therebetween changes. One use is on an electrically-powered mining vehicle, the power cable of which extends from a fixed power source to the vehicle-mounted reel. The controller is in a pay-in-mode whenever the distance between the reel and tie point is decreasing or remaining constant, and in a pay-out mode whenever said distance is increasing. During pay-in, pressurized hydraulic fluid is directed from the pump to the reel motor. During pay-out, pump output is occluded and fluid is directed through a restriction from the reel motor to the reservoir, the restriction serving to brake motor rotation. Two of four valves in the controller are hydraulically piloted in each position and biased in the pay-in position. A separate check valve ensures that pressure at the pilots is about equal during pay-in but unequal, favoring the pay-out position, when the reel is paying out cable.

21 Claims, 1 Drawing Sheet

HYDRAULICALLY-ACTUATED CONTROLLER FOR REEL DRIVE

FIELD OF THE INVENTION

This invention relates generally to hydraulically-actuated controllers for delivering hydraulic fluid from a pressurized source to and from a hydraulic motor operable in both rotational directions. In particular, the hydraulic controller controls pay-in and pay-out actions of a cable or hose reel driven by a hydraulic motor in applications where the cable or hose extends from the reel to a remote terminus and the length of the unwound portion is variable and must be maintained in a taut condition between the reel and the terminus. A typical such application is in electrically-driven underground mining vehicles powered via an electrical cable from a remote power supply.

BACKGROUND OF THE INVENTION

In a number of industrial operations, it is necessary to have a cable, hose, or other flexible member (hereinafter collectively referred to as a "cable") extending from a fixed terminus to a moving body, where the cable so extending must be taken up and maintained in a taut condition between the moving body and the fixed terminus.

One operation where this requirement is well-known is underground mining, where electrically-operated trackless vehicles and mining machines are becoming increasingly common. Such vehicles are typically connected to a main electrical supply via a cable extending from the vehicle to one of a number of regularly-spaced plug-in power sources, termed tie points. In order to prevent entangling the cable beneath the wheels of the vehicle or on obstacles while the vehicle is moving about, it is necessary to keep excess cable coiled on a reel or analogous device from which cable can be either payed out or payed in as the vehicle moves away from or toward the tie point, respectively. Usually, a number of tie points regularly spaced apart are available in the mine, thereby obviating the need for extremely long cables. Moving the vehicle long distances in the mine requires that the cable be unplugged from a more distant tie point and reconnected to a nearer tie point. Usually, mining machines are employed for periods of time in localized areas in the mine near a single tie point, where the tie point is located somewhere near the expected midpoint of vehicular travel at that location. Because there are many such power sources in a mine, economic considerations dictate that the take-up reel for the cable be mounted on the mining vehicle, not at each tie point. However, in other industrial applications it may be preferable to have the reel secured to a fixed location and the cable extending therefrom to a moving body or vehicle.

Whether the reel is located on the vehicle or is stationary, the mechanism that drives the reel must satisfy certain requirements. First, excess length of the cable must be kept wound upon the reel, preferably in an ordered lapped fashion to prevent kinking and damage to the cable. Second, the cable extending from the vehicle to the tie point must be maintained in a taut condition at all times. In other words, the reel must be driven to tautly pay in cable whenever the vehicle is moving toward the tie point, to keep the cable taut between the vehicle and tie point whenever the vehicle is remaining stationary, and to tautly pay out cable whenever the vehicle is moving away from the tie point. Third, all such motions of the reel should occur automatically. Fourth, the reel-like mechanism should be powerful to accommodate a heavy cable on a large, heavy reel. For example, an electrical cable for a modern mining vehicle can be three inches or more in diameter and weigh several tons when five hundred feet of it is fully coiled. A reel for such a cable can be up to five feet in diameter and five feet wide. Fifth, as experience has shown that hydraulically-driven reel mechanisms offer the best combination of power, quickness of response, and reliability, such hydraulic mechanisms must be capable of performing expected functions without excess heat generation. Such excess heat is a common problem with mobile hydraulic mining machinery constructed within difficult size and space constraints. Excess heat can cause premature failure of the hydraulic fluid (usually oil) and the hydraulic equipment. Improperly designed hydraulic equipment intended for high-power applications can experience catastrophic heat generation in a remarkably short period of time.

Several cable reel mechanisms have heretofore been patented. Slomer (U.S. Pat. No. 2,665,081) discloses a hydraulic controller intended for use with a positive-displacement, constant-output hydraulic pump, a hydraulic motor driven by the pump, and a reel driven by the motor. The controller includes an adjustable relief valve responsive to a change in the direction of hydraulic flow to vent excessive hydraulic pressure from the pump downstream to a fluid reservoir whenever the reel is stalled (vehicle stationary) or paying out cable (vehicle moving away from the power source). The only time the pump is not pumping fluid through the relief valve is when the reel is paying in cable at top speed. As a result, the Slomer device has serious disadvantages. In particular, because the reel motor is driven with a fixed-displacement pump, hydraulic fluid from the pump when not being used to drive the hydraulic motor must be externally shunted back to the fluid reservoir. Otherwise, the pump will stall or cause rupture of hydraulic conduits due to excessive pressure buildup. Unfortunately, such external shunting of hydraulic fluid from the pump causes rapid heating of the oil, especially at higher operating pressures. As a result, the Slomer device is only operable up to approximately 300 psig hydraulic pressure without overheating, which is many times less than operating pressures required on many types of modern equipment.

Maier (U.S. Pat. No. 4,114,827) discloses a hydraulic controller for a cable reel powered by a hydraulic motor supplied by a fixed-displacement, continuous-output pump. The controller includes a piloted and spring-biased bypass valve for unloading the pump whenever the vehicle is stationary or whenever cable is being payed out. The bypass valve pilot senses hydraulic pressure downstream of the reel motor, such pressure increasing during cable pay-out and when the reel is stalled. The controller also includes a pressure relief valve to ensure that pressure downstream of the pump never exceeds a preset limit (450 psig). Similar to the Slomer device, however, the Maier controller is designed for use with a fixed-displacement, constant-output hydraulic pump. As a result, excess pressure downstream of the pump during reel stall or cable pay-out must be externally shunted to the reservoir. Such shunting causes excessive heating of the hydraulic fluid unless the hydraulic pressure is maintained below a limit (450 psig) too low for many modern applications.

Carlson (U.S. Pat. No. 3,334,839) discloses another hydraulic system utilizing three fixed-displacement pumps: one to act as a reel-motion sensor, and two others to supply hydraulic pressure to the reel motor. The reel-motor pressure is controlled by a remote controlled relief valve that, in turn, is controlled by a system of shuttle valves. This system is less prone to heating than the Slomer and Maier systems, but is still limited only to about 450 psig or below. Further, the system is relatively complex with three fixed-displacement pumps instead of one, which decreases reliability. Finally, the 450 psig pressure limit is too low for many modern requirements.

The Lee patent (U.S. Pat. No. 2,912,184) discloses a hydraulic system for an entire mine haulage vehicle including its reel drive system. Two hydraulic pumps are employed to drive the reel, the first powered by an electric motor and the second by the vehicle's motion. The motor-driven pump is used for conditions requiring a relatively low hydraulic fluid flow rate, and the vehicle-driven pump is used for high-flow conditions. A disadvantage of this system is that the pumps are fixed-displacement types, which require that the pressures be kept low to avoid excessive heating of the system.

Oetringhaus (U.S. Pat. No. 4,511,100) and Pollman et al. (U.S. Pat. No. 4,537,364) disclose different types of closed-loop hydrostatic transmissions for cable reel drive systems that are controlled by electro-hydraulic servomechanisms. Since the hydraulic pumps are variable-displacement and bidirectional, there is no need to pump hydraulic fluid over relief at any time. As a result, both systems are capable of operating at pressures higher than 450 psig. Unfortunately, however, the systems incorporate a relatively large number of both electrical and mechanical components which render the systems complicated, expensive and less reliable than simpler all-hydraulic systems.

Modern, efficient underground mining operations, especially hard-rock mining but also including large-scale soft-rock (e.g., coal) mining, require much larger and more powerful vehicles and other equipment than in the past. Correspondingly, hydraulic systems on such vehicles and equipment must be much larger and more powerful than in the past. Where prior-art systems as described above operated satisfactorily at their pressure limits of 300–450 psig, modern systems require pressures of 2,000–3,000 psig or higher for satisfactory performance, which levels are simply beyond the capability of many prior-art systems. Further, since underground mining equipment must be reliable and maintenance services in most mines are irregular at best, relatively simple all-hydraulic systems not requiring electro-mechanical or other sophisticated sensors and feedback circuits have proven to be superior in terms of reliability and serviceability.

Hence, there is a need for a hydraulically powered reel mechanism capable of operating at 2,000 psig hydraulic pressure or higher without experiencing destructive heat buildup.

There is also a need for such a system operable only via, and responsive entirely to, hydraulic pressure for minimal complexity and maximal reliability.

There is also a need for such a system sufficiently powerful to operate the large heavy reels and cables required with modern industrial machinery.

SUMMARY OF THE INVENTION

The present invention is a novel hydraulic system and hydraulically-actuated controller for a reel used to windably store, pay in and pay out a flexible cable extending from the reel to a tie point so as to keep the cable taut as the distance between the reel and the tie point changes or remains constant. The system and controller are especially suited for heavy, high-capacity power cable reels on underground mining vehicles where high hydraulic pressures are required.

The reel is powered by a hydraulic motor supplied by a source of pressurized hydraulic fluid. The controller is hydraulically coupled at a first port to the source of pressurized hydraulic fluid, at a second port to a hydraulic motor powering the reel, and at a third port to a hydraulic fluid reservoir. The controller assumes a "pay-in" mode whenever the distance between the reel and the tie point is either decreasing or remaining constant, and a "pay-out" mode whenever said distance is increasing.

The controller includes at least first, second, third, and fourth valves intercoupling the first, second, and third ports. The first and second valves are each two-position valves that are hydraulically piloted in both the "pay-in" and "pay-out" positions, and spring-biased in the "pay-in" position. The first and second valves permit flow of pressurized hydraulic fluid from its source to the motor during the pay-in mode so as to apply a hydraulic force to turn the reel in a pay-in direction.

Responding to a transient pressure spike that occurs when the cable begins to be payed out from the reel, the first and second valves, with the help of the fourth valve (which is a one-way check valve), shift to their respective "pay-out" positions. This shift to pay-out causes the flow of hydraulic fluid from its source to be fully occluded by the first valve and the hydraulic fluid from the motor to be routed through the second valve and a flow-restriction imparted by the third valve to the fluid reservoir. A significant pressure drop across the "pay-out" position of the second valve ensures that the first and second valves remain in their respective "pay-out" positions so long as the reel is paying out. The flow restriction imparted by the third valve applies sufficient back pressure to the motor to impart a dynamic hydraulic braking to it during pay-out.

The present invention is particularly suitable for use with a variable-displacement, pressure-compensated pump serving as the source of pressurized hydraulic fluid because such pumps are not adversely affected when the flow of hydraulic fluid downstream of them is fully occluded, as occurs by the first valve during pay-out. Because the present invention does not pressure relieve the pump during pay-out, it is capable of operating without overheating at the high hydraulic pressures required of such reel systems used in modern industrial applications such as hard-rock mining.

One object of the present invention is to provide a controller for use with hydraulically-powered reel mechanisms capable of operating at 2,000 psig hydraulic pressure or higher without experiencing destructive heat buildup.

Another object of the present invention is to provide such a controller for use with a pressure-compensated variable displacement pump.

Another object is to provide such a controller operable only via, and responsive entirely to, hydraulic pressure.

Another object is to provide such a controller that substantially instantaneously shifts from a pay-in mode to a pay-out mode and from a pay-out to a pay-in mode as required to ensure that the cable extending from the reel to a tie point is maintained in a taut condition at all times during operation.

Another object is to provide such a controller having a simplicity and reliability suitable for use on underground mining equipment and vehicles.

Another object is to provide a hydraulic system including such a controller, a variable-displacement pressure-compensated hydraulic pump, and a hydraulic motor drivably coupled to a cable reel, the system mounted to an electrically powered mining vehicle and operable at about 2,000 to 3,000 psi hydraulic pressure.

These and other objects and features of the invention will be apparent from the following description and accompanying drawings.

DETAILED DESCRIPTION

Construction

Figure 1:
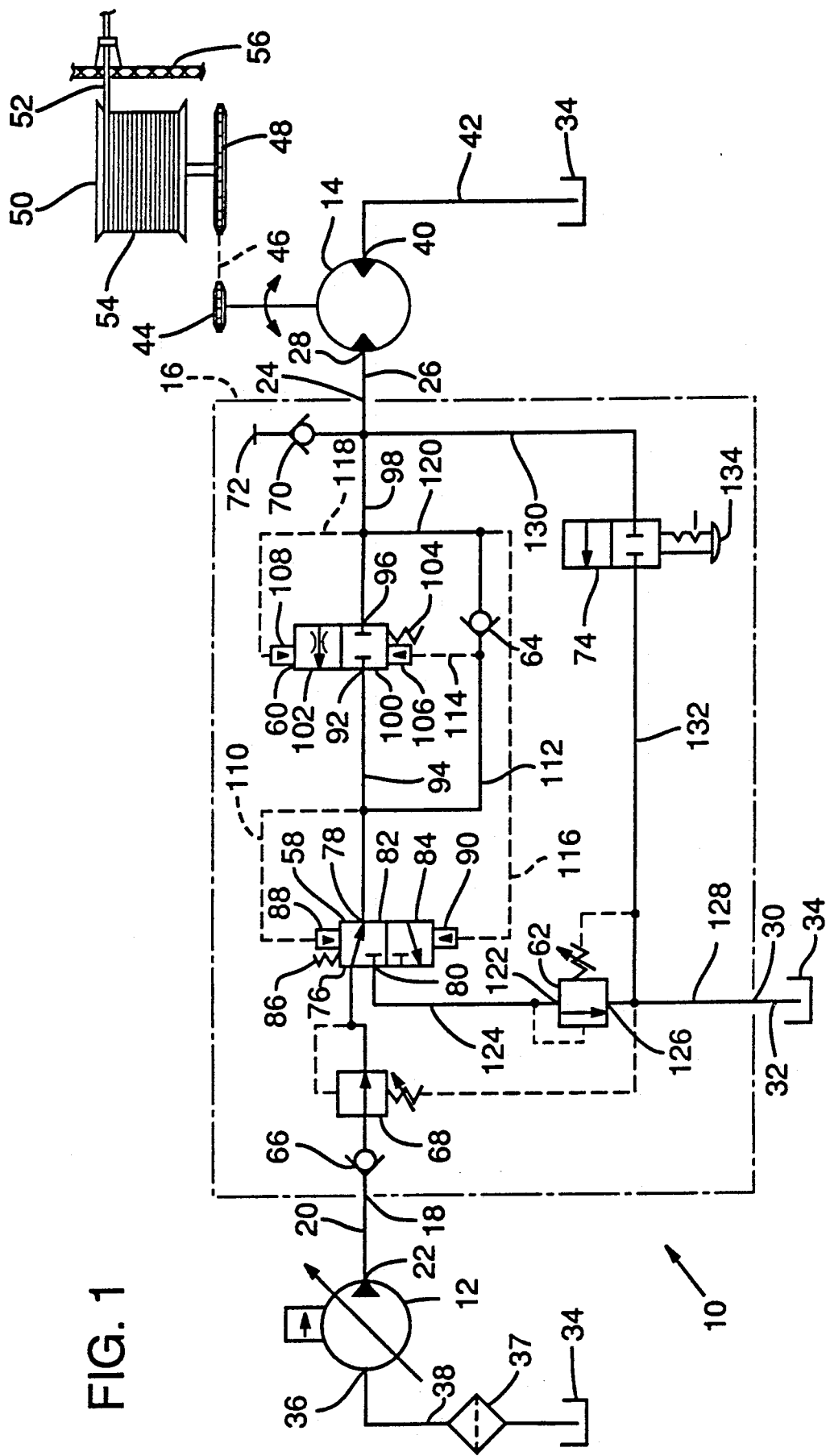
FIG. 1 is a schematic diagram of a hydraulic system and controller according to the present invention.

Referring to FIG. 1, the hydraulic controller 10 of the present invention is shown hydraulically coupled to a variable-displacement, unidirectional, pressure-compensated pump 12 and a bidirectional hydraulic motor 14. Preferably, the hydraulic controller 10 is incorporated into a manifold block 16 having a first port 18 hydraulically coupled via conduit 20 to the outlet port 22 of the pump 12, a second port 24 hydraulically coupled via conduit 26 to the first port 28 of the motor 14, and a third port 30 hydraulically coupled via conduit 32 to the hydraulic fluid reservoir 34. Note that the reservoir 34 is also coupled to a pump inlet 36 via a conduit 38 with in-line filter 37 and to a second port 40 of the motor 14 via a conduit 42.

In a preferred embodiment, the hydraulic motor 14 is coupled directly to a smaller sprocket 44 linked by a roller chain drive 46 or analogous mechanical linkage to a larger sprocket 48 coupled directly to the reel 50. The reel 50 is used to wind a length of cable 52 extending to a fixed tie point (not shown). (As used herein, "cable" refers generally, unless otherwise specified, to either electrical cable or other suitable flexible member wound on the reel 50 and extending therefrom to a fixed terminus, or tie point.) The means of coupling the reel 50 to the motor 14 as herein described is preferable for applications such as mining vehicles because a smaller but faster hydraulic motor may be used to turn a reel of a given size and weight than would be required if the coupling between the motor 14 and reel 50 were direct-drive. Even though modern mining vehicles carry large reels (up to five feet in diameter) holding a heavy load of wound cable (up to 3,500 pounds or more), problems with large centrifugal forces generated by a rapidly rotating reel are avoided because such vehicles travel a maximum of about five miles per hour. At such low vehicular velocities, a large reel rotates slowly. Use of a small, fast motor with appropriate gear-reduction to drive the reel allows the use of a smaller pump.

In the case of mining vehicles, the entire mechanism diagrammed in FIG. 1 is typically mounted on the rear of the vehicle (not shown). In other applications, the mechanism of FIG. 1 may be mounted adjacent to the fixed terminus of the cable (not shown), with the cable 52 terminating distally on a moving vehicle or other moving body (not shown).

To form even laps 54 of cable across the width of the reel 50, it is desirable to employ a level-wind mechanism 56, especially on large reels accommodating long or thick cables 52. The level-wind mechanism 56 is similar in design and function to that utilized, for example, on certain types of fishing reels, only much larger. The level-wind mechanism is typically actuated via mechanical linkage to the reel 50 or reel motor 14 (linkage not shown).

The present invention is usable with any variable-displacement, pressure-compensated pump 12 having a suitable pumping rate and pressure rating for the particular combination of motor 14, reel 50, cable 52 and anticipated maximum rate of pay-in and pay-out. This type of pump does not require an external bypass loop for pressure relief upon restricting or occluding the flow of hydraulic fluid downstream thereof. As a result, they may be used at high pressure (2,000 psig or more) without any external pressure relief without danger of overheating or pressure runaway. The present invention cannot be used with a fixed-displacement pump.

If the reel-drive system is situated on an electrically powered mining vehicle, the pump 12 is typically driven by an electric motor (not shown). However, in other applications of the present invention, other types of pump drive motors may be used, such as an internal combustion engine.

The hydraulic motor 14 can be any suitable rotary actuator operable in a first direction in response to upstream hydraulic pressure. When caused to rotate in the second, or opposite, direction, the hydraulic motor 14 pushes hydraulic fluid in the upstream direction (toward the pump 12). In the embodiment of a cable reel for a mining vehicle, the hydraulic motor 14 is preferably a gear-within-gear ("Gerotor") type.

Continuing, the controller 10 comprises minimally a first (or control) valve 58, a second (or pressure differential) valve 60, a third (or pressure-relieving) valve 62, and a first check valve 64, all hydraulically intercoupled with one another, as described below. Although it is preferable to contain the above-named valves in a manifold block 16, such containment is not necessary. Other components that are desirable under certain uses of the present invention, but not required for other uses, include a second check valve 66, an adjustable pressure regulator 68, a third check valve 70, a pressure sampling port 72, and a manually-actuated bypass valve 74, all described in further detail below.

In the preferred embodiment shown, the outlet port 22 of the pump 12 is coupled via conduit 20 to the second check valve 66. The second check valve 66 is oriented so as to only allow passage of hydraulic fluid in a direction away from the pump 12, thereby protecting the pump 12 from reverse hydraulic flow, regardless of operating conditions.

The second check valve 66 is coupled to the adjustable pressure regulator 68, which allows the pressure downstream from it to be preset at a desired level equal to or less than the pressure at the pump outlet 22. Such pressure reduction may be required if, for example, the pump 12 is employed to provide pressurized hydraulic fluid for not only the reel-drive mechanism but also for other vehicle-mounted mechanisms such as brakes or digging equipment that require an even higher operating pressure than the reel drive mechanism. If included, the pressure regulator is typically adjusted to regulate downstream pressure within the range of about 1,500 to 2,500 psig when the upstream pressure is about 2,500 psig. Pressure regulator 68 would not be required if the pump 12 powered only the reel-drive mechanism and were pressure compensated at a level specifically for that purpose.

The first (or control) valve 58 has an inlet port 76, an outlet port 78, and an exhaust port 80. The inlet port 76 is coupled to the pressure regulator 68 (if a pressure regulator is used). The first valve 58 has a first, or "pay-in" position 82 and a second, or "pay-out" position 84. In other words, the first valve 58 is a two-position, three-way valve. The first valve 58 also includes a spring bias 86 which, in the absence of any opposing force, urges the valve to remain in the first or pay-in position 82. The first valve 58 also includes a first hydraulic pilot 88 serving the first position 82 and a second hydraulic pilot 90 serving the second position 84.

The second (or pressure-differential) valve 60 has an outlet port 92 coupled via conduit 94 to the outlet port 78 of the first valve 58, and an inlet port 96 coupled via conduit 98 to the second port 24 of the controller 10. The second valve 60 has a first, or normally-closed, position 100 and a second, or open, position 102. In other words, the second valve 60 is a two-position, two-way valve. The second valve 60 also includes a spring bias 104 which, in the absence of any opposing force, urges the valve to remain in the first, or normally-closed, position 100. The second valve 60 also includes a first hydraulic pilot 106 serving the first position 100 and a second hydraulic pilot 108 serving the second position 102.

Conduit 94 not only connects the outlet port 78 of the first valve 58 with the outlet port 92 of the second valve 60, but also with the first pilot 88 of the first valve 58 through conduit 110 and with the first pilot 106 of the second valve 60 through conduits 112 and 114. Conduit 98, downstream of the second valve 60, is connected to both the second pilot 90 of the first valve 58 through conduit 116 and the second pilot 108 of the second valve 60 through conduit 118. Such common connections of first pilots 88, 106 together and both second pilots 90, 108 together ensure that both valves 58 and 60 shift substantially simultaneously, as described further below.

First check valve 64 is coupled to the intersection of conduits 112 and 114, allowing hydraulic flow therefrom through first check valve 64 only in the direction toward the intersections of conduits 116, 118, 98 and 120.

The third valve 62 of the controller 10 is an adjustable pressure-relieving valve having an inlet port 122 coupled via a conduit 124 to the exhaust port 80 of the first valve 58, and an outlet port 126 coupled via a conduit 128 to the third port 30 of the controller 10. The third valve 62 regulates the pressure upstream from it to a value preset by the operator. Pressure vented from both the pressure regulator 68 and the third valve 62 passes through the conduit 128 to the reservoir 34.

The optional manually-actuated bypass valve 74, if included, is coupled between conduits 98 and 128 through conduits 130 and 132, respectively. Bypass valve 74 is a two-position, two-way valve that is normally closed during automatic operation of the reel 50, but is manually openable via handle 134 to pass pressurized hydraulic fluid therethrough from the second port 24 of the controller 10 directly to the reservoir 34, thereby relieving pressure at the motor inlet port 28 to about atmospheric pressure. Although not required, this valve is particularly advantageous during maintenance of the reel mechanism or if the operator for any reason wishes to manually turn the reel 50 without disconnecting the drive chain 46.

The controller 10 serves to regulate and control the delivery of pressurized hydraulic fluid from the pump 12 to the motor 14 to cause the reel 50 to "pay in" or wind the cable 52 thereon. When the reel 50 is "paying out" or unwinding cable, such as, for example, when a mining vehicle on which the reel is located is moving away from the cable tie point, the controller 10 serves to regulate and control the delivery of pressurized hydraulic fluid passing therethrough from the motor 14 to the reservoir 34. In response to hydraulic pressure changes resulting from the motor 14 either rotating in a pay-in direction, remaining stalled, or rotating in a pay-out direction, the controller 10 automatically shifts back and forth between a "pay-in" mode and a "pay-out" mode as required to keep the cable taut between the reel 50 and the fixed terminus of the cable. The controller 10 is in a "pay-in" mode whenever the vehicle is moving either toward the cable tie point or remaining stationary. The controller 10 is in a "pay-out" mode whenever the vehicle is moving away from the cable tie point.

Operation

During both the pay-in and pay-out modes, the pump 12 draws hydraulic fluid from reservoir 34 through the filter 37 and conduit 38 and delivers the pressurized fluid through conduit 20 to the first, or pump, port 18 of the hydraulic controller 10. The fluid then passes through the second check valve 66 and the pressure regulator 68 to the inlet port 76 of the first valve 58.

Pay-In Mode

When the controller 10 is in the pay-in mode, the first valve 58 is biased by spring 86 to remain shifted to the first position 82. Hydraulic fluid then passes through the first valve 58 from the inlet port 76 to the outlet port 78 and through conduit 94 to the outlet port 92 of the second valve 60. From conduit 94, hydraulic fluid also passes through conduit 110 to pressurize the first pilot 88 of first valve 58 and through conduit 112, first check valve 64 and conduit 116 to pressurize the second pilot 90 of first valve 58. Because the pressure drop across first check valve 64 is only about 5 psi, the pressures at the first pilot 88 and the second pilot 90 are about equal, thereby allowing the first valve 58 to remain in the first position 82 under the influence of the bias spring 86. So long as first valve 58 remains shifted to the first position 82, the valve is in a "pay-in" position.

In the pay-in mode of the controller 10, hydraulic fluid also passes through conduit 114 to the first pilot 106 of the second valve 60 and, after passing through first check valve 64, conduits 120 and 118 to the second pilot 108 of the second valve 60. Because the pressure drop across first check valve 64 is only about 5 psi, the pressures at the first pilot 106 and the second pilot 108 are about equal, thereby allowing the second valve 60 to remain in the normally-closed position 100 under the influence of the bias spring 104. So long as second valve 60 remains shifted to the normally closed position 100, the valve is in a "pay-in" position.

Continuing in the pay-in mode, hydraulic fluid also passes through conduit 98 to the second port 24 of controller 10, through conduit 26, then to the inlet port 28 of the motor 14. Pressurized hydraulic fluid passing through the motor 14 to the outlet port 40 thereof causes the motor 14 to rotate, thereby rotating in combination the sprocket 44, the sprocket 48 coupled thereto via the roller chain 46, and the reel 50 in a pay-in direction. As the reel 50 rotates in a pay-in direction, the cable 52 is wound upon the reel 50. After passing through the motor 14, hydraulic fluid then passes through the conduit 42 to the reservoir 34.

Hydraulic fluid cannot pass out of the controller 10 other than as described above during the pay-in mode because the third check valve 70 prevents escape of fluid through the sample port 72 (if included). Also, the bypass valve 74, unless manually opened, prevents any bypass of pressurized hydraulic fluid away from the motor 14.

As can be seen, therefore, valves 58 and 60 remain in the pay-in mode unless a high-pressure event occurs somewhere between the inlet port 96 of the second valve 60 and the inlet port 28 of the motor 14. When used as a cable reel for an electric-powered mining vehicle, the hydraulic system of the present invention during pay-in has a hydraulic pressure at the motor inlet port 28 of about 2,000 psig. This pressure is sufficient to turn a large reel (e.g., five feet in diameter) holding up to two tons of cable as required to keep the cable 52 taut during any conditions during which the reel 50 is paying in the cable.

Cable Reel Stationary

During conditions in which the reel is stationary, the controller 10 remains in the pay-in mode. The hydraulic pressure at the motor inlet port 28 remains at the same level (about 2,000 psig) as when the reel 50 was paying in cable. This is because first valve 58 and second valve 60 remain in their first, or "pay-in," positions whenever the reel is stationary. More specifically, the pressures at all four pilots 88, 90, 106 and 108 are about equal, thereby allowing the bias springs 86 and 104 to keep the first and second valves 58 and 60, respectively, in their pay-in positions. As a result, hydraulic pressure is conducted to the motor inlet 28 just as if the reel were expected to pay-in cable. Such pressure is sufficient to ensure that the cable 52 extending from the reel 50 to the tie point is maintained in a taut condition.

Pay-Out Mode

Considering further the example of a mining vehicle equipped with the present invention, at the moment the vehicle begins to move away from the cable tie point, the cable extending tautly thereto exerts a torque to the reel 50 in a pay-out direction. The reel 50 thereby urges the motor 14 to rotate in a pay-out direction, which causes a pressure spike (about 150 psig) above the pay-in pressure between the motor inlet 28 and the inlet port 96 of valve 60. This pressure spike will be conducted to both the second pilot 108 of the second valve 60 and the second pilot 90 of the first valve 58. However, because the first check valve 64 will not pass fluid therethrough in an upstream direction and because the second valve 60 is instantaneously still in the normally closed position 100, first pilots 88 and 106 of the first and second valves 58 and 60, respectively, do not experience the pressure spike as do the second pilots 90 and 108. This momentary pressure imbalance is sufficient to cause the second valve 60 to shift to the open, or "pay-out," position 102 against the force exerted in combination by the bias spring 104 and first pilot thereof 106, and valve 58 to simultaneously shift to the second, or "pay-out," position 84 against the force exerted in combination by the bias spring 86 and first pilot thereof 88.

After so shifting to their respective "pay-out" positions, valves 58 and 60 remain so shifted so long as the vehicle is moving away from the cable tie point because second valve 60 has a considerable pressure drop therethrough from the inlet port 96 to the outlet port 92 (about 150 psig), which maintains the pressure imbalance at second pilots 90 and 108 relative to first pilots 88 and 106. Hence, so long as the reel 50 is paying out cable, pressurized hydraulic fluid passage from the pump 12 is fully occluded or blocked at the inlet port 76 of the first valve 58. Hydraulic fluid from the motor 14 passes through the second valve 60 from the inlet port 96 to the outlet port 92 thereof, through the conduit 94, through the first valve 58 from the outlet port 78 to the exhaust port 80 thereof, through conduit 124, through the third (pressure-relieving) valve 62, through conduit 128 and into the reservoir 34.

Because the output of hydraulic fluid from the pump 12 is effectively turned off during pay-out, the hydraulic pressure at the motor inlet 28 drops from the momentary "spike" maximum of about 2,150 psig (in the mining-vehicle embodiment of the present invention) to about 1,500 psig after valves 58 and 60 shift to their respective "pay-out" positions. The latter pressure is maintained because of the pressure drop across second valve 60 (about 150 psi) from the inlet port 96 to the outlet port 92 thereof in combination with the pressure drop across the third valve 62 (which is adjustable).

The 1,500 psig back pressure applied to the motor 14 during pay-out serves to hydraulically brake motor rotation. Such dynamic braking prevents the reel 50 from paying out more cable than required to keep the cable 52 taut between the reel 50 and the cable tie point.

The moment the reel 50 ceases paying out cable, the pressures at pilots 88, 90, 106, and 108 become about equal, allowing the bias springs 86 and 104 to shift the first and second valves, respectively, to the first and normally closed positions (pay-in positions), respectively.

If at any time one wishes to instantaneously reduce the hydraulic pressure at the motor inlet port 28 to about atmospheric pressure without disconnecting the drive chain 46, handle 134 of the bypass valve 74 is turned to shift the valve 74 to the open position. Such pressure relief may be necessary to perform maintenance or to manually turn the reel 50.

If one wishes to measure the pressure between the inlet port 96 of the second valve 60 and the motor inlet port 28, a pressure gauge or similar device is coupled to the pressure sample port 72. The gauge must be capable of opening check valve 70 after coupling. Such pressure measurements during pay-in and pay-out may be particularly helpful during adjustment of pressure regulator 68 and third valve 62.

Having illustrated and described the principles of my invention in a preferred embodiment and variations thereof, it should be apparent to those skilled in the art that the present invention may be modified in arrangement and detail without departing from the principles thereof. I claim as my invention all modifications coming within the scope and spirit of the following claims.

I claim:

1. A hydraulic controller for use with a reel used for windably storing a flexible cable extending from the reel to a tie point to which a distal terminus of the cable is affixed, the reel paying out a required length of the cable whenever the distance between the reel and said tie point is increasing, maintaining the unwound cable extending from the reel to the tie point in a taut condition when said distance is remaining constant, and paying in the cable when said distance is decreasing, the reel powered by a hydraulic motor hydraulically coupled to a source of pressurized hydraulic fluid, the controller comprising:

a first port hydraulically coupled to the source of pressurized hydraulic fluid, a second port hydraulically coupled to the motor, and a third port hydraulically coupled to a reservoir of hydraulic fluid;

a hydraulic pressure-actuated valving means for valving the flow of hydraulic fluid from the first port to the second port and from the second port to the third port, the valving means assuming a pay-in mode when the distance between the reel and the tie point is either decreasing or remaining constant, and a pay-out mode when said distance is increasing;

(a) in which pay-in which the valving means passing pressurized hydraulic fluid from the first port to the second port to drive the hydraulic motor to urge the reel to rotate in a pay-in direction; and (b) in which pay-out mode the valving means occluding passage of hydraulic fluid from the first port through the valving means to the second port and passing a partially restricted flow of pressurized hydraulic fluid from the second port to the third port so as to hydraulically brake rotation of the motor when the reel is rotating in a pay-out direction;

the valving means comprises a first, a second, a third, and a fourth valve, the first, second, third, and four valves hydraulically intercoupled, wherein;

(a) the first valve is a two-position valve having an inlet port, an outlet port, and an exhaust port, the inlet port coupled to the first port of the valving means;

(b) the second valve is a two-position valve having an inlet port coupled to the second port of the valving means and an outlet port coupled to both the outlet port of the first valve and the second port of the valving means;

(c) the third valve is an adjustable pressure-relieving pressure-control valve having an inlet port coupled to the exhaust port of the first valve and an outlet port coupled to the third port of the valving means; and (d) the fourth valve is a check valve having an inlet port coupled to the outlet port of the second valve and an outlet port coupled to the second port of the valving means.

2. The controller of claim 1 wherein the valving means switches from the pay-in to the pay-out mode or from the pay-out to the pay-in mode in response to changes in hydraulic pressure at the second port thereof occurring when the reel begins or ceases paying out the cable, respectively.

3. The controller of claim 1 wherein the first valve includes a bias means for exerting a force serving to keep the first valve in a first position whenever the valving means is in the pay-in mode, in which position hydraulic fluid passes through the first valve from the inlet port to the outlet port thereof.

4. The controller of claim 3 wherein the first valve includes a first hydraulic pilot serving the first position of the valve and a second hydraulic pilot serving the second position of the valve, the first pilot coupled and responsive to hydraulic pressure at the outlet port of the first valve and the second hydraulic pilot coupled and responsive to hydraulic pressure at the second port of the valving means, which second pilot pressurized sufficiently to maintain the first valve in the second position against the combined opposing forces exerted by the bias means and the first pilot whenever the valving means is in the pay-out mode, in which second position the first valve passes hydraulic fluid therethrough only from the outlet port to the exhaust port thereof.

5. The controller of claim 1 wherein the second valve includes a bias means for exerting a force serving to keep the second valve in a normally closed position whenever the valving means is in the pay-in mode.

6. The controller of claim 5 wherein the second valve includes a first hydraulic pilot serving the closed position of the valve and a second hydraulic pilot serving the open position of the valve, the second pilot coupled and responsive to hydraulic pressure at the inlet port of the second valve and the first hydraulic pilot coupled and responsive to hydraulic pressure at the outlet port of the second valve, the second pilot pressurized sufficiently to open the valve against the combined opposing forces exerted by the bias means and the first pilot of the second valve whenever the valving means is in a pay-out mode, in which open position the second valve passes hydraulic fluid therethrough from the inlet port to the outlet port thereof.

7. The controller of claim 6 wherein the second valve, when in the open position, has a sufficient pressure drop therethrough from the inlet to the outlet ports thereof such tat, when the valving means is in the pay-out mode, the hydraulic pressure at the second pilot of the second valve is sufficiently great to keep the second valve in the open position against the combined opposing forces exerted by the first pilot and bias means of the second valve.

8. The controller of claim 7 wherein the pressure drop from the inlet port to the outlet port of the second valve when said valve is in the open position is about 150 psig when the hydraulic pressure at the inlet port thereof is about 1,500 psig.

9. The controller of claim 1 wherein the first valve includes:

(a) a first valve bias means for exerting a force serving to keep the first valve in a first position whenever the valving means is in the pay-in mode, in which position hydraulic fluid passes through the first valve from the inlet port to the outlet port thereof; and (b) a first hydraulic pilot serving the first position of the valve and a second hydraulic pilot serving a second position of the valve, the first pilot coupled and responsive to hydraulic pressure at the outlet port of the first valve and the second hydraulic pilot coupled and responsive to hydraulic pressure at the second port of the valving means, which second pilot pressurized sufficiently to maintain the first valve in the second position against the combined opposing forces exerted by the first bias means and the first pilot whenever the valving means is in the pay-out mode, in which second position the first valve passes hydraulic fluid therethrough only from the outlet port to the exhaust port thereof; and the second valve includes:
(a) a second bias means for exerting a force serving to keep the second valve in a normally closed position when the valving mean si in the pay-in mode; and
(b) a first hydraulic pilot serving the closed position of the valve and a second hydraulic pilot serving the open position of the valve, the first pilot coupled and responsive to hydraulic pressure at the outlet port of the second valve and the second hydraulic pilot coupled and responsive to hydraulic pressure at the inlet port of the second valve, the second pilot pressurized sufficiently to open the valve against the combined opposed forces exerted by the second bias means and the first pilot of the second valve whenever the valving means is in a pay-out mode, in which open position the second valve passes hydraulic fluid therethrough from the inlet port of the outlet port thereof.

10. The controller of claim 9 wherein the second valve, when in the open position, has a sufficient pressure drop therethrough from the inlet to the outlet ports thereof such that, when the valving means is in the pay-out mode, the hydraulic pressure at the second pilot of the first valve and the second pilot of the second valve is sufficiently great to keep both the first valve in the second position and the second valve in the open position against the combined opposing forces exerted by the respective first pilots and bias means of the first and second valves.

11. The controller of claim 1 further comprising:
a check valve coupled between the first port of the valving means and the inlet port of the first valve; and
an adjustable pressure-reducing valve coupled between said check valve and the inlet port of the first valve, the check valve and pressure-reducing valve in combination allowing passage of pressurized hydraulic fluid therethrough only in the direction from the pump to the inlet port of the first valve at a hydraulic pressure no greater than the pressure at the first port of the valving means.

12. The controller of claim 11 wherein the pressure drop across the pressure-reducing valve is within the range of about 1,500 to 2,500 psig when the pressure at the first port of the valving means is about 2,500 psig.

13. The controller of claim 9 further comprising:
a check valve coupled between, and only allowing passage of hydraulic fluid therethrough in a direction from, the first port of the valving means to the inlet port of the first valve; and
a pressure-reducing valve coupled between the check valve and the inlet port of the first valve, the pressure-reducing valve maintaining the hydraulic pressure at the inlet port of the first valve no greater than the pressure at the first port of the valving means.

14. The controller of claim 13 further comprising a normally closed, manually operated on-off valve hydraulically coupled between the inlet port of the second valve and the outlet port of the third valve, whereby hydraulic pressure at the second port of the valving means may be manually shunted directly to the reservoir, thereby reducing the hydraulic pressure thereat to about atmospheric pressure.

15. A hydraulic system for controllably powering a rotatable reel mounted on a vehicle, the reel tautly paying out a flexible cable both wound thereon and having a distal terminus extending from the reel to a fixed extravehicular tie point when the vehicle is moving away form the tie point, maintaining the unwound cable extending from the reel to the tie point in a taut condition when the vehicle is stationary, and tautly paying in the cable on the reel when the vehicle is moving toward the tie point, the system comprising:
a reservoir of hydraulic fluid;
a variable-displacement pressure-compensated hydraulic pump supplying a stream of pressurized hydraulic fluid from the preservoir;
a hydraulic motor drivably coupled to the reel and supplied with pressurized hydraulic fluid by the pump, the pump thereby turning the motor in a first direction to rotate the reel in a pay-in direction, the reel when paying out cable turning the motor in a pay-out direction opposite to the pay-in direction;
a hydraulic controller controlling delivery of hydraulic fluid from the pump to the motor and from the motor to the reservoir, the controller comprising
(a) a first port hydraulic ally coupled to the pump, a second port hydraulically coupled to the motor, and a third port hydraulically coupled to the reservoir;
(b) a hydraulically-actuated valving means hydraulically intercoupling the first, second, and third ports, the valving means automatically assuming a pay-in mode when the vehicle is either moving toward the tie point or remaining stationary and a pay-out mode when the valve is moving away from the tie point, in which pay-in mode the valving means passing pressurized hydraulic fluid from the first port to the second port to cause the hydraulic motor to apply a rotational force to the reel in a pay-in direction and in which pay-out mode the valving means occluding passage of hydraulic fluid from the first port to the valving means while passing a partially restricted flow of pressurized hydraulic fluid from the second port to the third port so as to hydraulically brake rotation of the motor when the reel is rotating in a pay-out direction;
the valving means comprises a first valve, a second valve, a third valve, and a fourth valve, the first valve
(a) having an inlet port, an outlet port, and an exhaust port, the inlet port coupled to the first port of the valving means, and
(b) passing hydraulic fluid therethrough from the inlet port to the outlet port thereof during the pay-in mode and passing hydraulic fluid therethrough from the outlet port to the exhaust port thereof during the pay-out mode;
the second valve
(a) having an inlet port coupled to the second port of the valving means and an outlet port coupled to both the outlet port of the first valve and the second port of the valving means, and
(b) remaining closed during the pay-in mode and passing hydraulic fluid therethrough from the inlet port to the outlet port thereof during the pay-out mode;
the third valve (a) having an inlet port coupled to the exhaust port of the first valve and an outlet port coupled to the third port of the valving means, and (b) passing hydraulic fluid therethrough at a preset pressure from the inlet port to the outlet port thereof during the pay-out mode when the second valve is open; and the fourth valve is a check valve (a) having an inlet port coupled to the outlet port of the second valve and an outlet port coupled to the second port of the valving means, and (b) passing hydraulic fluid therethrough only in the direction from the inlet port to the outlet port thereof.

16. The hydraulic system of claim 15 wherein the first and second valves shift from a pay-in to a pay-out mode and from a pay-out to a pay-in mode in response to changes in hydraulic pressure at the second port of the valving means occurring when the reel begins or ceases paying out the cable, respectively.

17. The hydraulic system of claim 16 wherein the first and second valves are each hydraulically piloted to shift from the pay-in to the pay-out mode in response to a hydraulic pressure spike at the second port of the valving means occurring at the onset of pay-out.

18. The hydraulic system of claim 17 wherein the second valve, when in the open position, has a sufficient pressure drop therethrough from the inlet to the outlet ports thereof such that, when the valving means is in the pay-out mode, the hydraulic pressure of the second pilots of both the first and second valves is sufficiently great to keep both the first valve in the second position and the second valve in the open position against the combined opposing forces exerted by the respective first pilots and bias means of the first and second valves.

19. The hydraulic system of claim 15 wherein the valving means further comprises:

a check valve coupled between, and only allowing passage of hydraulic fluid therethrough in a direction from, the first port of the valving means to the inlet port of the first valve;

a pressure-reducing valve coupled between the check valve and the inlet port of the first valve, the pressure-reducing valve maintaining the hydraulic pressure at the inlet port of the first valve no greater than the pressure at the first port of the valving means.

20. A hydraulic controller for controlling the operation of a cable reel driven by a hydraulic motor to pay-in and pay-out cable as required to accommodate a variable distance between the cable reel and the distal end of the cable, the controller comprising:

valving means operable in a first position to direct flow of a pressurized hydraulic fluid in a first direction from a source thereof to an inlet of the hydraulic motor, thereby establishing a first hydraulic pressure at the motor inlet to urge the reel to rotate in a pay-in direction when the distance between the reel and the distal end of the cable is decreasing;

the valving means remaining the first position so long as the pressure at the inlet of the motor does not exceed the first pressure so as to maintain the cable taut when the distance between the reel and the distal end of the cable is constant;

the valving means shifting to and operable in a second position in response to a second hydraulic pressure at the motor inlet in excess of the first pressure to block flow of pressurized hydraulic fluid from the source thereof to the motor and to direct flow of pressurized hydraulic fluid in a second direction from the motor to a reservoir of hydraulic fluid to enable the motor to a reservoir of hydraulic fluid to enable the motor to rotate in a direction permitting the reel to pay-out cable when the distance between the reel and the distal end of the cable is increasing;

the valving means remaining in the second position until the flow of pressurized hydraulic fluid in the second direction from the motor inlet to the reservoir ceases, at which time the valving means shifts to the first position;

the valving means comprising a first, a second, a third, and a fourth valve, wherein;

(a) the first valve is operable in a pay-in position when the valving means is in the first position and in a pay-out position when the valving means is in the second position, the pay-in and pay-out positions served by a first and a second pilot, respectively, of the first valve and the pay-in position further served by a bias means exerting a force assisting said first pilot;

(b) the second valve is operable in a pay-in position when the valving means is in the first position and a pay-out position when the valving means is in the second position, the pay-in and pay-out positions served by a first and a second pilot, respectively, of the second valve and the pay-in position further served by a bias means exerting a force assisting the first pilot of the second valve;

(c) the third valve is a pressure-relieving valve;

(d) the fourth valve is a check valve;

(e) the hydraulic pressures at the respective first and second pilots are about equal when the first and second valves are in their respective pay-in positions, in which pay-in positions the first valve passes hydraulic fluid therethrough from the source to the second valve, and the second valve occludes passage of hydraulic fluid therethrough, thereby causing the fluid to pass through the fourth valve from the first valve to the motor inlet;

(f) the pressures a the respective second pilots are greater than the pressures at the respective first pilots when the first and second valves are in their respective pay-out positions, such pressure differences sufficient to overcome the force exerted by each respective bias means, such greater pressure applied at said second pilots as a result of the fourth valve occluding flow of hydraulic fluid therethrough whenever said flow is in the second direction and the second valve having a substantial pressure drop therethrough when in the pay-out position; and (g) in which pay-out positions the second valve passes hydraulic fluid from the motor inlet to the first valve, and the first valve passes fluid from the second valve to the third valve, when third valve having a pressure drop therethrough sufficient to keep the hydraulic pressure at the motor inlet at a level adequate to brake rotation of the reel when the reel is paying out cable.

21. The controller of claim 20 wherein the pressure drop through the second valve when in the pay-out position is about 150 psig when the hydraulic pressure at the motor inlet is about 1500 psig.

* * * * *

UNITED STATES PATENT AND TRADEMARK OFFICE
CERTIFICATE OF CORRECTION

PATENT NO. : 5,007,599
DATED : April 16, 1991
INVENTOR(S) : Allen P. Forsyth

It is certified that error appears in the above-identified patent and that said Letters Patent is hereby corrected as shown below:

Column 6, line 48, "adJustable" should be --adjustable--;

Column 11, claim 1, line 23, "pay-in which" should be --pay-in mode--;

Column 12, claim 7, line 36, "tat," should be --that,--;

Column 13, claim 9, line 5, "si" should be --is--;

Column 14, claim 15, line 14, "preservoir" should be --reservoir--;

Column 14, claim 15, line 25, "hydraulic ally" should be --hydraulically--;

Column 14, claim 15, line 34, "valve" should be --vehicle--;

Column 15, claim 20, line 59, "remaining the" should be --remaining in the--;

Column 16, claim 20, lines 3-4, delete second occurrence of the phrase "to a reservoir of hydraulic fluid to enable the motor"; and Column 16, claim 20, line 59, "when" should be --which--.

Signed and Sealed this

Twenty-sixth Day of October, 1993

Attest:

BRUCE LEHMAN

Attesting Officer     Commissioner of Patents and Trademarks